United States Patent
Baumann et al.

(10) Patent No.: US 10,116,015 B2
(45) Date of Patent: Oct. 30, 2018

(54) TEMPERATURE CONTROL DEVICE FOR TEMPERATURE CONTROLLING A BATTERY

(71) Applicant: Mahle International GmbH, Stuttgart (DE)

(72) Inventors: Tobias Baumann, Oberstenfeld (DE); Joachim Treier, Oppenau (DE); Jerome Stoeckel, Bollwiller (FR)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/577,338

(22) PCT Filed: May 25, 2016

(86) PCT No.: PCT/EP2016/061844
§ 371 (c)(1),
(2) Date: Nov. 27, 2017

(87) PCT Pub. No.: WO2016/189056
PCT Pub. Date: Dec. 1, 2016

(65) Prior Publication Data
US 2018/0151924 A1    May 31, 2018

(30) Foreign Application Priority Data
May 28, 2015 (EP) ..................... 15169656

(51) Int. Cl.
| H01M 10/615 | (2014.01) |
| H01M 10/6571 | (2014.01) |
| H01M 10/6556 | (2014.01) |
| H05B 3/28 | (2006.01) |

(Continued)

(52) U.S. Cl.
CPC ..... *H01M 10/615* (2015.04); *H01M 10/6556* (2015.04); *H01M 10/6571* (2015.04); *H05B 3/06* (2013.01); *H05B 3/28* (2013.01); *H01M 10/625* (2015.04); *H05B 2203/02* (2013.01)

(58) Field of Classification Search
None
See application file for complete search history.

(56) References Cited

U.S. PATENT DOCUMENTS

2015/0090427 A1    4/2015   Brandauer et al.

FOREIGN PATENT DOCUMENTS

| EP | 2343769 A1 | 7/2011 |
| WO | WO-9206570 A1 | 4/1992 |

*Primary Examiner* — Sarah A. Slifka
(74) *Attorney, Agent, or Firm* — Fishman Stewart PLLC

(57) ABSTRACT

A temperature control device for temperature controlling a battery of a vehicle may include a housing defining a housing interior. The housing may include a housing bottom and a housing lid. A plurality of tubular bodies may be arranged in the housing interior adjacent to one another for a coolant to flow therethrough. A heating device may also be disposed within the housing interior and may include, on each of a lower side facing the housing bottom and on a top side facing the housing lid, a lower or an upper electrical contact plate for connecting the electric heating device to an electric source of energy. An electrical insulation may be disposed between the housing bottom and a lower electrical contact plate. The electric heating device and the electrical insulation may be formed as a heating module unit. The heating module unit may be installed into the housing as a unitary component to the housing.

20 Claims, 2 Drawing Sheets

(51) Int. Cl.
*H05B 3/06* (2006.01)
*H01M 10/625* (2014.01)

TEMPERATURE CONTROL DEVICE FOR TEMPERATURE CONTROLLING A BATTERY

CROSS-REFERENCE TO RELATED APPLICATIONS

This application claims priority to PCT/EP2016/061844 filed on May 25, 2016, which also claims priority to EP 15169656.4 filed on May 28, 2015, the contents of which are hereby incorporated by reference in their entirety.

TECHNICAL FIELD

The present invention relates to a temperature control device for tempering a battery, in particular of a motor vehicle, and to a battery arrangement with such a temperature control device. The invention furthermore relates to a motor vehicle with such a battery arrangement.

Rechargeable battery systems for electric vehicles with purely electric drive and for hybrid vehicles and vehicles with fuel cell drive are subject of current research. At present, preferably lithium ion batteries are employed in the vehicle categories, which are characterized by high energy density and an only lightly pronounced undesirable memory effect. The ability of a rechargeable battery to reliably supply the consumers that are present in the motor vehicles with electric energy substantially depends on the thermal conditions that are present in the surroundings of the battery. For both the electrochemical processes which take place in the battery when making available and also absorbing electric energy—in terms of recharging—are greatly dependent on the operating temperature of the battery. Investigations on various battery systems of lithium-ion base have shown for example that below a critical temperature, for example in the region of approximately 0° C., the electric energy density made available by the battery decreases greatly compared with higher operating temperatures. In addition, below the critical temperature the lithium-ion cell can be damaged during charging.

Accordingly, the provision of thermally well-defined ambient conditions is of substantial importance for efficient and trouble-free operation of said batteries in the motor vehicle. With respect to the substantial temperature fluctuations that operationally occur during the operation of the motor vehicle this means that these have to be offset through suitable temperature control devices that are thermally coupled to the battery in order to keep the ambient temperature of the battery and thus also the temperature of the battery itself within a predetermined temperature range. Such a device on the one hand has to be able to increase the ambient temperature in the immediate surroundings of the battery should the same assume a value that is below the permissible temperature range. On the other hand it must be possible to lower the ambient temperature if it upwardly exceeds this mentioned temperature range.

BACKGROUND

The invention is based on the object of creating a temperature control device for temperature controlling a battery which is characterized by effective thermal coupling to the battery to be heated or to be cooled.

The mentioned objects are solved according to the invention by the subject of the independent patent claims. Preferred embodiments are subject of the dependent claims.

SUMMARY

Accordingly, the basic idea is to equip a temperature control device for a battery with multiple tubular bodies through each of which a coolant can flow, which are arranged in the housing of the temperature control device next to one another. By omitting individual tubular bodies during the assembly of the temperature control device, hollow spaces can be created in a simple manner, in which electric heating devices can be mounted. In this way, tubular bodies for cooling the battery with a coolant and electric heating devices for heating the battery can be jointly accommodated in a very small installation space. In addition to this, even cooling or heating output can be generated for the battery to be temperature controlled by means of the temperature control device according to the invention introduced here with tubular bodies alternating in the housing interior for cooling the battery and with heating devices for heating the battery. Finally, the mounting of the temperature control device introduced here is extremely simple which results in reduced production costs.

A temperature control device for temperature controlling a battery according to the invention has a housing bounding a housing interior, which comprises a housing bottom of a metal. Preferentially, the housing lid consists of a plastic material. In the housing interior, a plurality of tubular bodies arranged next to one another is present for coolant to flow through. Furthermore, in addition to at least one tubular body, preferentially between at least two adjacent tubular bodies, an electric heating device is additionally arranged in the housing interior. Preferably, two or more heating devices are present in the housing interior.

With a preferred embodiment, the tubular bodies are designed as elongated flat tubes extending along a main flow direction of the coolant. The at least one electric heating device in this case is arranged in a transverse direction transversely to the main flow direction between two adjacent flat tubes.

Preferentially, a hollow space is formed between at least two adjacent tubular bodies in which the heating device is received. The arrangement of the heating device in this case is effected in such a manner that it fills out the hollow space to at least 80%, preferentially to at least 90%. Particularly preferably, the heating device substantially fills out the hollow space. By means of these measures, the forming of undesirable intermediate spaces diminishing the thermal coupling between the heating device and the battery to be heated in the housing interior can be avoided.

Particularly practically, the hollow body for receiving the heating device is dimensioned in such a manner that the volume of the hollow space substantially corresponds to the volume of a tubular body. To this end, such a hollow space can be created by "non-assembly" of an individual tubular body in the housing interior during the course of the assembly.

In a further preferred embodiment, the geometry of the hollow space substantially corresponds to the geometry of an individual tubular body. Such a construction materialises when in the particular place in the housing interior, in which the heating device is to be installed, no tubular body is installed. In other words, said hollow space can be created in the location concerned by simply "omitting" a tubular body.

Particularly practically, the at least one heating device can be formed elongated and have a long side along the main flow direction the length of which is at least five times, preferentially at least ten times, maximally preferentially at least twenty times the length of a transverse side extending transversely to the main flow direction.

To reduce the installation space requirement in the housing interior of the housing, it is proposed to realise the at least one heating device in flat design. To this end it is proposed to dimension the outer dimensions of the heating device in such a manner that the heating device in a longitudinal direction perpendicularly defined by the long side and also regarding the transverse direction defined by the transverse side has a height that is a maximum of a tenth of the length of the long side. Particularly preferred is a version in which said height is a maximum of a twentieth of the length of the long side.

In a further preferred embodiment, the at least one heating device on a lower side facing the housing bottom comprises a lower electrical contact plate for connecting the electric heating device to a source of electrical energy. Analogously, the heating device on a top side facing the housing lid comprises an upper electrical contact plate for connecting the electric heating device to the source of electrical energy.

In order to avoid an electric short circuit between the heating device in particular its heating elements with the metallic housing bottom and via the same with the battery to be temperature controlled, the temperature control device in an advantageous further development is equipped with an electrical insulation which is arranged between the housing bottom of the housing and the lower contact plate of the heating device.

Particularly easy to manufacture is the electrical insulation with a further preferred embodiment, in which the material of the electrical insulation comprises or is a ceramic.

In an advantageous further development of the invention, which is obvious in particular for realising the temperature control device in flat design, the electrical insulation can be formed plate or layer-like and be arranged sandwich-like between the housing bottom and the lower contact plate.

As particularly preferably an embodiment may be considered in which the heating device with the two contact plates and the electrical insulation are formed as a heating module unit. Such a heating module unit is fastened as a unitary component to the housing bottom by means of a bonded joint and can therefore be particularly easily installed in the housing. In particular when assembling a temperature control device with a plurality of heating devices, such a module construction of the heating device results in substantial simplifications during the assembly. This results in noticeable cost advantages in the production of the temperature control device.

A particularly even provision in terms of space both of heating output by the heating devices and also of cooling output by the tubular bodies through which coolant flows can be achieved according to a further preferred embodiment, in which between each two adjacent heating devices the same number of tubular bodies is arranged in the housing interior.

Particularly practically, electric heating elements, for example in the form of so-called PTC heating elements, can be installed in the heating device. For this reason it is proposed to equip the at least one heating device in each case with at least two heating elements, preferentially with a plurality of heating elements. The arrangement of the heating elements in this case is effected in such a manner that these are arranged between the two contact plates along the main flow direction spaced from one another. For all heating elements of a respective heating device, a common upper and a common lower contact plate are present here.

In a further preferred embodiment, the housing bottom is designed as bottom plate and the housing lid as plastic cover. Between bottom plate and plastic cover the plurality of tubular bodies and the at least one heating device are arranged sandwich-like. This approach also allows realising the temperature control device with a very low installation space height which proves to be advantageous in particular when using the temperature control device in a motor vehicle.

In another preferred embodiment, the temperature control device comprises a common manifold fluidically connected to the tubular bodies for distributing and subsequently collecting the coolant over the tubular bodies or from the tubular bodies. In this version, the temperature control device also comprises a deflection manifold. The manifold and the deflection manifold in this case are arranged in corners of the housing located opposite the main flow direction. With this embodiment, the provision of an elaborate line system for distributing the coolant over the individual tubular bodies and for collecting the coolant after it flowed through the tubular bodies can be omitted.

Furthermore, the invention relates to a battery arrangement for a motor vehicle with a battery to be temperature controlled, in particular a lithium-ion battery. Thermally coupled to the battery to be temperature controlled is a temperature control device introduced above. To form the desired thermal coupling to the temperature control device, the battery housing lies flat against the housing bottom of the temperature control device.

The invention finally relates to a motor vehicle with at least one such battery arrangement.

Further important features and advantages of the invention are obtained from the subclaims, from the drawings and from the associated figure description with the help of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

It shows, in each case schematically

DETAILED DESCRIPTION

Figure 1:
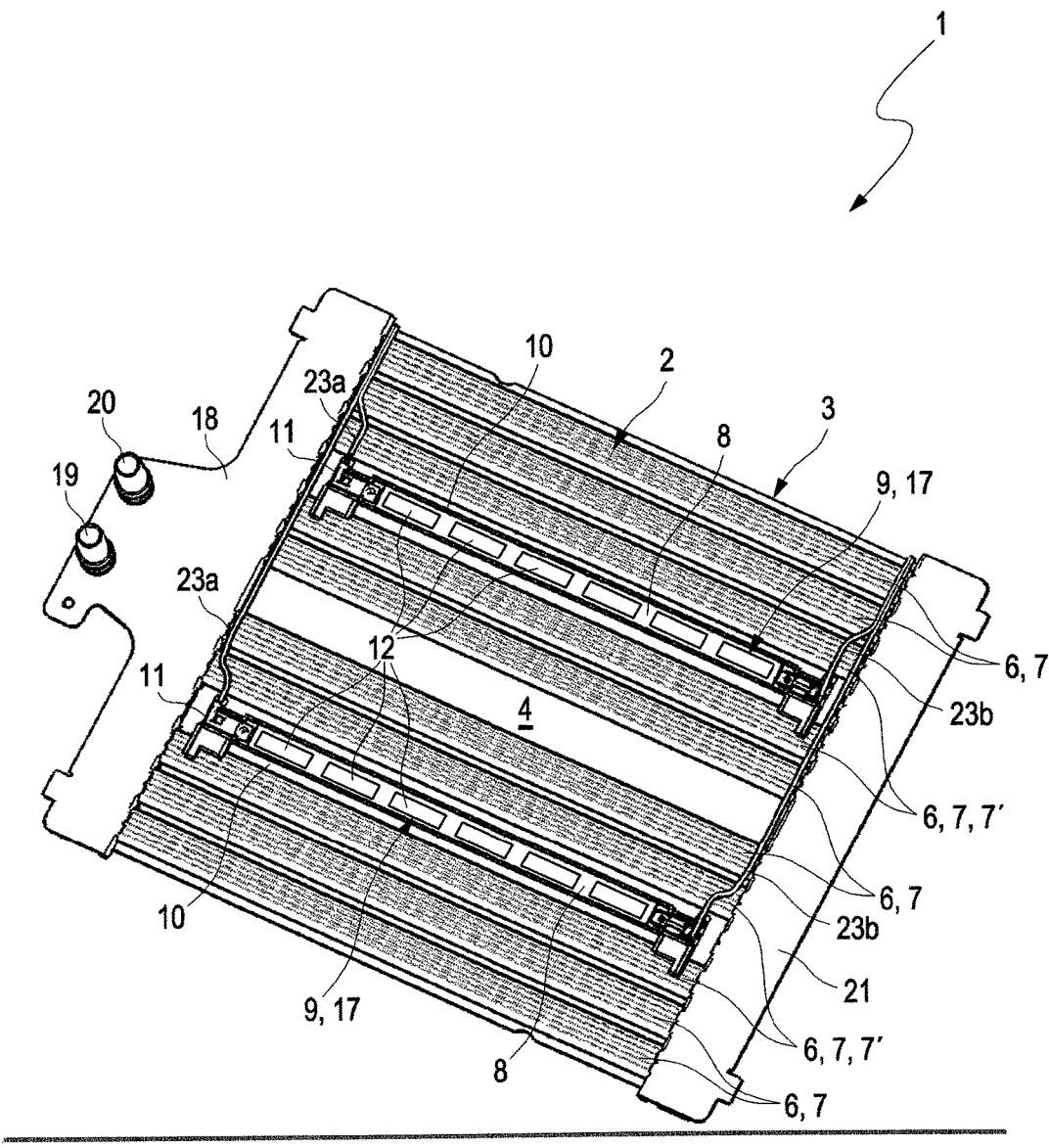
FIG. 1 an example of a temperature control device 1 according to the invention with opened housing lid in a perspective representation, FIG. 2 the temperature control device of FIG. 1 with opened housing lid in an assembled state, FIG. 3 the temperature control device in a cross section along the section line of FIG. 2.
Figure 2:
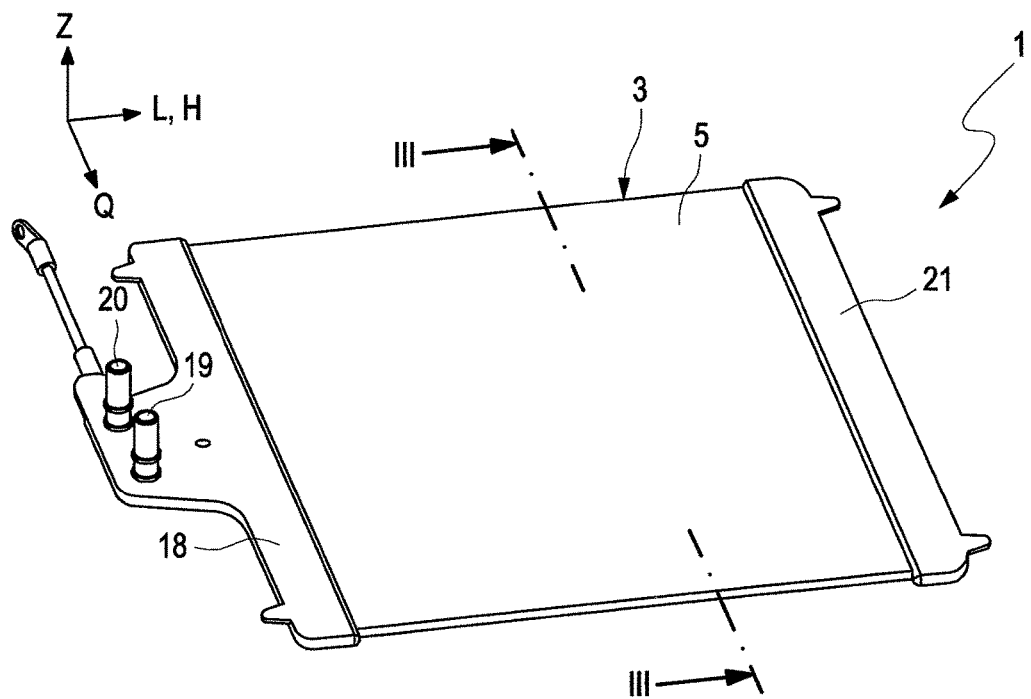

FIG. 1 illustrates an example of a temperature control device 1 according to the invention in a partly assembled state in a perspective representation. FIG. 2 shows the temperature control device 1 of FIG. 1 in an assembled state. The temperature control device 1 comprises a housing 3 bounding a housing interior 2, which comprises a housing bottom 4 of a metal and a housing lid 5 of a plastic material. With its battery housing, the battery (not shown in the figures for the sake of clarity) to be temperature controlled by means of the temperature control device 1 is brought to bear flat against the housing bottom 4 of the housing 3. FIG. 1 shows the housing 3 in an opened state, i.e. without housing lid 5. According to FIG. 1, the temperature control device 1 comprises a plurality of tubular bodies 6 arranged adjacent to one another in the housing interior 2 for coolant to flow through.

The tubular bodies 6 are formed as elongated flat tubes 7, which extend along a main flow direction H of the coolant flowing through the tubular body 6. Through thermal interaction with the battery to be temperature controlled by the temperature control device 1 the coolant can absorb waste heat generated by the battery and in this way cool the battery. By the main flow direction H of the flat tubes 7 a longitudinal direction L of the tubular bodies 6 or flat tubes 7 is defined. The tubular bodies 6 or flat tubes 7 are arranged adjacent to one another in a transverse direction Q running transversely to the longitudinal direction L or main flow direction H. In the example of FIG. 1, a hollow space 8 each is formed between the tubular bodies 7 adjacent in the transverse direction Q additionally marked with 7'. Geometry and volume of the hollow spaces 8 in this case each correspond to the volume or the cylindrical geometry of an individual tubular body 7. During the course of the assembly of the temperature control device 1, the two hollow spaces 8—in versions of the example another number of hollow spaces 8 is also conceivable—can be created by "non-assembly" of a respective tubular body 7 in the housing interior 2. In the two hollow spaces 8, an electric heating device 9 each is arranged. By means of the electric heating device 9, the battery to be mechanically and thermally coupled to the temperature control device 1 and temperature controlled can be heated.

In other words, in the transverse direction Q between two adjacent tubular bodies 6 or flat tubes 7 a heating device 9 is arranged. The heating device 9 likewise extends along the main flow direction H and thus along the longitudinal direction L of the tubular bodies 6 or flat tubes 7. In the example of FIG. 1, the two hollow spaces 8 are partly filled out by a respective heating device 9. With a version of the temperature control device 1 with particularly compact design it is conceivable to dimension the tubular bodies 6, the hollow spaces 8 and the heating devices 9 in such a manner that the heating devices 9 fill out the hollow spaces 8 to at least 80%. Preferentially, the hollow spaces 8 and the heating devices 9 are dimensioned in such a manner that the heating devices 9 fill out the hollow spaces 8 to at least 80%. With a particularly preferred version, the heating devices 9 substantially fill out the hollow spaces 8 completely. With all three versions, the forming of undesirable intermediate spaces diminishing the thermal coupling between heating device 9 and the battery to be temperatured (not shown) is largely or even completely avoided.

From the representation of FIG. 1 it is evident that the heating devices 9 can also be realised in flat design and elongated. In the example scenario, each heating device 9 has a long side 10 along the main flow direction H, i.e. along the longitudinal direction L, the length of which is at least five times the length of a transverse side extending transversely to the main flow direction H, i.e. along the transverse direction Q. Preferentially, the length of the long side 10 is at least ten times the length of the transverse side 11, particularly preferably even at least twenty times. For realising the flat design, the heating device 9 has a height in a direction Z perpendicularly both to the longitudinal direction L and also to the transverse direction Q which is a maximum of a tenth of the length of the long side 11.

Each of the heating devices 9 can comprise two or more heating elements—in FIG. 1 merely indicated schematically and marked with the reference number 12—, which are arranged adjacent to one another along the main flow direction H. The heating elements 12 can be realised as PTC-elements. For realising the flat design, the housing bottom 4 are formed preferentially as bottom plate and the housing lid 5 as plastic cover, between which the plurality of tubular bodies 6 or flat tubes 7 and the heating devices 9 are arranged sandwich-like.

Figure 3:
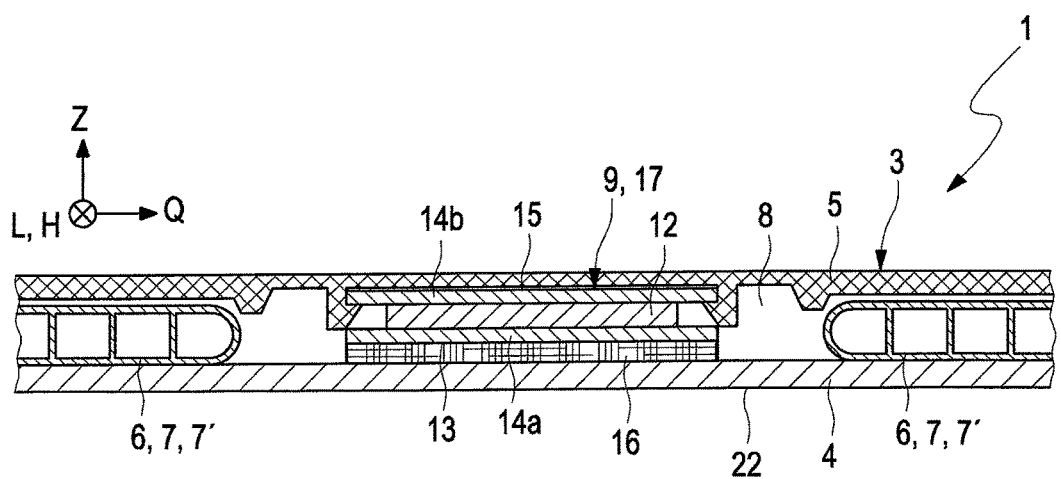

FIG. 3 shows the temperature control device 1 of FIG. 2 in a cross section along the section line of FIG. 2. From FIG. 3 it is evident that the heating devices 9 on a lower side 13 facing the housing bottom 4 and on a top side 15 facing the housing lid 5 each have a lower or upper electrical contact plate 14a, 14b for electrically contacting the heating elements 12 of the electric heating device 9 with a source of electrical energy (not shown). The heating elements 12 of the heating device 9 are arranged between the two contact plates 14a, 14b sandwich-like. The two contact plates 14a, 14b can extend over the entire heating device 9 in longitudinal direction L, whereas the individual heating elements 12 as indicated in FIG. 1 can be arranged spaced from one another. The electrical contact plates 14a, 14b can be connected to the positive or negative terminal of a source of electrical energy via suitable electrical line paths 23a, 23b. The electrical line paths 23a, 23b can be realised as electrical current rails with an electrically insulating cladding or coating or as conventional electrical cables.

In order to electrically insulate the lower contact plate 14a from the housing bottom 4 of metal and in this way avoid an undesirable electrical short circuit between the housing bottom 4 and the lower electrical contact plate 14a, an electrical insulation 16 preferentially of a ceramic is arranged between the housing bottom 4 of a metal and the lower contact plate 14a of the heating device 9. Such a ceramic not prevents an electrical short circuit between the housing bottom 4 and the lower contact plate 14a but also ensures a particularly good thermal coupling of the heating device 9 to the housing bottom 4 and via the same to the battery to be temperature controlled. In a version of the example, another suitable electrically insulating material can also be used instead of a ceramic material for the electrical insulation.

In the example of FIG. 3, the electrical insulation 16 is formed plate-like and arranged sandwich-like between the housing bottom 4 and the lower contact plate 14a. In a version, the electrical insulation 16 can also be formed layer-like.

Preferentially, the heating device 9, the two contact plates 14a, 14b and the electrical insulation are formed as a heating module unit 17, which can be preassembled as a unit prior the installation in the housing 3 of the temperature control device 1. This simplifies the assembly of the temperature control device 1. In a state in which it is installed in the housing 3, the electrical insulation 16 of the heating module unit 17 is fastened to the housing bottom 4 by means of a bonded joint. In the example of the figures, the two heating devices 9 are thus part of a respective heating module unit 17, so that the temperature control device 1 comprises two heating module units 17. In a version of the example, the number of the heating devices 9 and thus of the heating module units 17 can vary.

The battery to be temperature controlled with its battery housing (not shown in FIG. 3 for the sake of clarity) is brought to bear flat against a side 22 of the housing bottom 4 facing away from the housing interior 2.

Particularly preferably, the same number of tubular bodies 6 is arranged in the housing interior 2 between two heating devices 9 or heating module units 17 which are adjacent in transverse direction Q. For example, in the case of a temperature control device 1 with four heating devices 9 (not shown in the figures) four tubular bodies 6 each or flat tubes 7 can be arranged next to one another between two heating devices 9 which are adjacent in the transverse direction Q. Such a spatially even distribution of the tubular bodies 6 and of the heating devices 9 allows a spatially homogenous provision of cooling or heating output to the battery to be temperature controlled.

In the example scenario of the figures, the housing bottom 4 are formed as bottom plate and the housing lid 5 as plastic cover, between which the tubular bodies 6 or flat tubes 7 and the heating devices 9 are arranged sandwich-like. In this way, the temperature control device 1 can be realised in flat design with a particularly low height.

From FIGS. 1 and 2 it is evident, furthermore, that the temperature control device 1 comprises a common manifold 18 that is fluidically connected to the tubular bodies 6 for distributing and subsequently collecting the coolant over the tubular bodies 6 or from the tubular bodies 6. In the example of the figures, the manifold 18 extends the housing 3 along the longitudinal direction L or main flow direction H. On the manifold 18, a coolant inlet 19 and a coolant outlet 20 are present. By way of the coolant inlet 19, the coolant can be introduced into the manifold 18 where it can be distributed over the tubular bodies 6 or flat tubes 7 by means of a suitably formed channel structure (not shown in the figures). Following the distribution of the coolant from the manifold 18 over individual tubular bodies 6 and the flowing of coolant through these tubular bodies 6, the coolant is again conducted into individual tubular bodies 6 via the deflection manifold 21. For this purpose, a suitably designed cannel structure an also be present in the deflection manifold (21) (not shown in the figures for the sake of clarity). Having again flowed through the tubular bodies 6, the coolant can be again conducted out of the temperature control device 1 via the manifold 18 and the coolant outlet 20 provided therein.

The terms "housing bottom", "housing lid", "upper contact plate" and "lower contact plate" relate to a possible position of usage for example when using the temperature control device 1 in a motor vehicle. It is clear that the temperature control device 1 can also be installed with another orientation, for example in such a manner that the component described as "housing bottom" here, can also be installed above the "housing lid" in a motor vehicle. Obviously, a lateral installation position is not excluded either.

The invention claimed is:

1. A temperature control device for temperature controlling a battery of a motor vehicle comprising:
    a housing defining a housing interior, the housing having a metal housing bottom and a housing lid;
    a plurality of tubular bodies arranged in the housing interior adjacent to one another for a coolant to flow therethrough, wherein an electric heating device is arranged in the housing interior in addition to the plurality of tubular bodies;
    wherein the heating device includes, on each of a lower side facing the housing bottom and on a top side facing the housing lid, a lower or an upper electrical contact plate for connecting the electric heating device to an electric source of energy;
    wherein an electrical insulation is disposed between the housing bottom and the lower electrical contact plate; and
    wherein the electric heating device, having the lower and the upper electrical contact plates, and the electrical insulation are formed as a heating module unit, wherein the heating module unit is installed into the housing as a unitary component to the housing bottom via a bonded joint.

2. The temperature control device according to claim 1, wherein the plurality of tubular bodies comprise a plurality of elongated flat tubes extending along a main flow direction of the coolant in the plurality of tubular bodies; and wherein the electric heating device is arranged in a transverse direction transversely to the main flow direction between two adjacent flat tubes of the plurality of elongated flat tubes and extends along the main flow direction.

3. The temperature control device according to claim 1, wherein a hollow space is defined between at least two adjacent tubular bodies of the plurality of tubular bodies, and wherein the electric heating device is received in the hollow space so that the electric heating device fills out the hollow space to at least 80%.

4. The temperature control device according to claim 3, wherein a volume of the hollow space substantially corresponds to a volume of at least one of the plurality of tubular bodies.

5. The temperature control device according to claim 3, wherein a geometry of the hollow space substantially corresponds to a geometry of at least one of the plurality of tubular bodies.

6. The temperature control device according to claim 1, wherein the electric heating device is elongated and includes a long side extending along the main flow direction having a length at least five times a length of a transverse side extending transversely to the main flow direction.

7. The temperature control device according to claim 6, wherein the electric heating device is flat and disposed in a direction perpendicular both relative to a longitudinal direction defined by the long side and also relative to a transverse direction defined by the transverse side, and wherein the electric heating device has a maximum height of a tenth of the length of the long side.

8. The temperature control device according to claim 1, further comprising at least one second electric heating device arranged between the lower and the upper electrical contact plates along the main flow direction adjacent to one another.

9. The temperature control device according to claim 1, wherein a material of the electrical insulation comprises a ceramic or is a ceramic.

10. The temperature control device according to claim 1, wherein the electrical insulation comprises a plate or a layer and is arranged sandwich-like between the housing bottom and the lower contact plate.

11. The temperature control device according to claim 1, further comprising at least a second electric heating device, and wherein between two adjacent electric heating devices a corresponding number of the plurality of tubular bodies is arranged in the housing interior.

12. The temperature control device according to claim 1, wherein the electric heating device comprises at least one heating element arranged spaced from one another along the main flow direction.

13. The temperature control device according to claim 1, wherein the housing bottom comprises a bottom plate and the housing lid comprises a plastic cover, and wherein the plurality of tubular bodies and the at least one electric heating device are arranged sandwich-like between the bottom plate and the housing lid.

14. The temperature control device according to claim 1, wherein the temperature control device comprises a common manifold fluidically connected to the plurality of tubular bodies to distribute and subsequently collect the coolant over the plurality of tubular bodies or from the plurality of tubular bodies and a deflection manifold, wherein the common manifold and the deflection manifold are arranged on opposing ends of the housing with respect to the main flow direction.

15. A battery arrangement for a motor vehicle comprising:
a Li-ion battery;
a temperature control device thermally coupled to the battery, the temperature control device comprising: a housing defining a housing interior, the housing having a metal housing bottom and a housing lid; a plurality of tubular bodies arranged in the housing interior adjacent to one another for a coolant to flow therethrough, wherein an electric heating device is arranged in the housing interior in addition to the plurality of tubular bodies; wherein the heating device includes, on each of a lower side facing the housing bottom and on a top side facing the housing lid, a lower or upper electrical contact plate for connecting the electric heating device to an electric source of energy; wherein an electrical insulation is disposed between the housing bottom and the lower electrical contact plate; and wherein the electric heating device having the lower and the upper electrical contact plates, and the electrical insulation are formed as a heating module unit, the heating module unit secured to the housing bottom via a bonded joint; and
wherein the battery housing for forming the thermal coupling lies flat against the housing bottom of the temperature control device.

16. A motor vehicle with at least one battery arrangement comprising:
a Li-ion battery;
a temperature control device thermally coupled to the battery, the temperature control device comprising: a housing defining a housing interior, the housing having a metal housing bottom and a housing lid; a plurality of tubular bodies arranged in the housing interior adjacent to one another for a coolant to flow therethrough, wherein an electric heating device is arranged in the housing interior in addition to the plurality of tubular bodies; wherein the heating device includes, on each of a lower side facing the housing bottom and on a top side facing the housing lid, a lower or upper electrical contact plate for connecting the electric heating device to an electric source of energy; wherein an electrical insulation is disposed between the housing bottom and the lower electrical contact plate; and wherein the electric heating device having the lower and the upper electrical contact plates, and the electrical insulation are formed as a heating module unit, the heating module unit secured to the housing bottom via a bonded joint; and
wherein the battery housing for forming the thermal coupling lies flat against the housing bottom of the temperature control device.

17. The temperature control device according to claim 1, wherein a hollow space is defined between at least two adjacent tubular bodies of the plurality of tubular bodies, and wherein the electric heating device is received in the hollow space so that the electric heating device fills out the hollow space to at least 90%.

18. The temperature control device according to claim 1, wherein a hollow space is defined between at least two adjacent tubular bodies of the plurality of tubular bodies, and wherein the electric heating device is received in the hollow space so that the electric heating device fills out the hollow space substantially completely.

19. The temperature control device according to claim 1, wherein the electric heating device is elongated and includes a long side extending along the main flow direction having a length at least twenty times a length of a transverse side extending transversely to the main flow direction.

20. The temperature control device according to claim 6, wherein the electric heating device is flat and disposed in a direction perpendicular both relative to a longitudinal direction defined by the long side and also relative to a transverse direction defined by the transverse side, and wherein the electric heating device has a maximum height of a twentieth of the length of the long side.

* * * * *